United States Patent [19]
Charters et al.

[11] 4,302,942
[45] Dec. 1, 1981

[54] SOLAR BOOSTED HEAT PUMP

[75] Inventors: William W. S. Charters, Lower Templestowe; Leonard E. Taylor, Mt. Clear, both of Australia

[73] Assignee: The University of Melbourne, Parkville, Australia

[21] Appl. No.: 926,967

[22] Filed: Jul. 21, 1978

[51] Int. Cl.³ .............................. F25B 27/00; F24J 3/02
[52] U.S. Cl. .................................... 62/235.1; 62/228; 126/133; 237/2 B
[58] Field of Search ..................... 62/2, 238 E, 324 D, 62/228 B, 324 A; 237/2 B; 126/433

[56] References Cited
U.S. PATENT DOCUMENTS

3,991,938  11/1976  Ramey ........................................ 62/2
4,179,894  12/1979  Hughes ............................. 62/160 X

Primary Examiner—William E. Wayner
Attorney, Agent, or Firm—McAulay, Fields, Fisher, Goldstein & Nissen

[57] ABSTRACT

A solar boosted heat pump for providing heating or cooling including a heat conducting plate which has an uninsulated rear surface and is exposed to the atmosphere and operates as a direct solar and ambient heat absorber when in its cooling mode. A refrigerant fluid carrying tube is provided in heat transfer relationship with the conducting plate which forms a part of a closed refrigerant flow system having a compressor and a heat exchanger in heat exchange relationship with a heat transfer medium. The plate also includes a sensor for varying the speed and/or the displacement of the compressor dependent on the light incident onto or energy on the plate.

14 Claims, 10 Drawing Figures

SOLAR BOOSTED HEAT PUMP

This invention relates to a solar boosted heat pump and in particular to an air source heat pump which is satisfactory for use in areas in which there are periods of available solar radiation and ambient air temperatures which may be lower than those required for effective operation of other heat pump systems. Using this system the temperature of the refrigerant vapour at the outlet from the evaporator may be above that of the lower temperature source because of the trapped solar energy.

There have previously been proposed heat pumps which rely on air passing through an evaporator to effect evaporation of a refrigerant fluid. It is found with such pumps that the compressor power used may be such that they are not economically feasible for heating purposes.

It is an object of the invention to provide a heat pump which reduces the compressor power necessary by increasing the suction temperature of the compressor vapour charge.

The invention, in its broadest sense, comprises a solar boosted heat pump having an uninsulated or partly insulated heat conducting plate having at least one fluid carrying tube in heat transfer relationship with the plate, the plate being a solar absorber, at least one valve means at the inlet to the fluid carrying tube(s) to control refrigerant flow through the plate, the valve(s) being controlled by the superheat temperature of the vapour leaving the tube, a compressor associated with the outlet of the plate and a heat exchanger associated with a heat transfer medium.

The heat conducting plate is preferably uninsulated but in certain applications may be partially insulated.

The heat transfer medium may be used as a thermal storage.

Preferably the valve means is a thermostatic expansion valve, but a float controlled valve may be used in association with a flooded evaporator.

Preferably the heat pump may be adapted so the flow of fluid in the system may be reversed so the direction of heat transfer may be reversed. We prefer that the speed or displacement rate of the compressor may be varied so that on variable conditions the most effective speed of operation can be selected.

This speed or displacement rate variation may be automatically controlled by solar radiation incident on the plate in various ways.

One way which can be used to vary the operation of the compressor is to provide a photo-electric or light-sensitive cell on or associated with the heat conducting plate which cell forms part of a gate fixing mechanism which controls the cyclic power applied to a universal, such as a brush type, motor which drives the compressor. Preferably if this form of control is used a delay system is built into the circuit to take into account the delay between the change in conditions and the change in the outlet temperature, which is related to the suction pressure to the compressor.

A second way in which the control may be achieved is by providing a heat sensitive element at or adjacent to the outlet from the plate. This will provide an output which is dependent on the outlet temperature, and thus the suction pressure which output can be used to control the motor operation.

Where there is high incident radiation more energy can be removed from the plate by operating the compressor at relatively high speed and/or displacement rate although under these conditions the co-efficient of performance (COP) is reduced.

In order that the invention may be more readily understood we shall describe one particular form of heat pump made in accordance with the invention with relation to the accompanying drawings.

Figure 1:
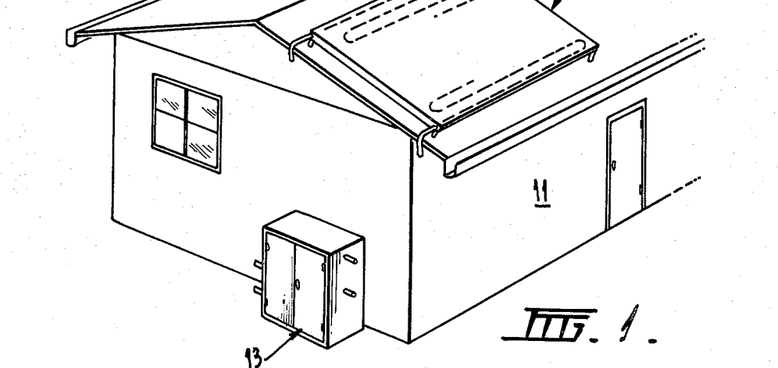
FIG. 1 is a purely schematic view of the system of the invention.

Referring to the drawings FIG. 1 shows an idealised perspective of a part of a house 11 on which there is mounted a solar absorber plate 10. This plate would normally be northwardly directed in the southern hemisphere and southwardly directed in the northern hemisphere.

The angle at which the absorber plate 10 is located relative to the horizontal is not critical but for optimum efficiency depends on the latitude of the place in which the unit is to be located and preferably also may be varied depending on the season of the year.

The latitude in Melbourne, Australia is 37°49′ and an inclination of 53° for winter use is preferred. This angle gives, generally, the best overall absorption for the Melbourne winter heating period.

The total heat absorption into or transmission from the plate 10 is made up from two components, the first being direct radiation which is unidirectional and is received from the sun directly and the other being diffuse radiation which is solar radiation which has been scattered by atmospheric air, dust and clouds, and has been reflected from adjacent areas.

Figure 2:
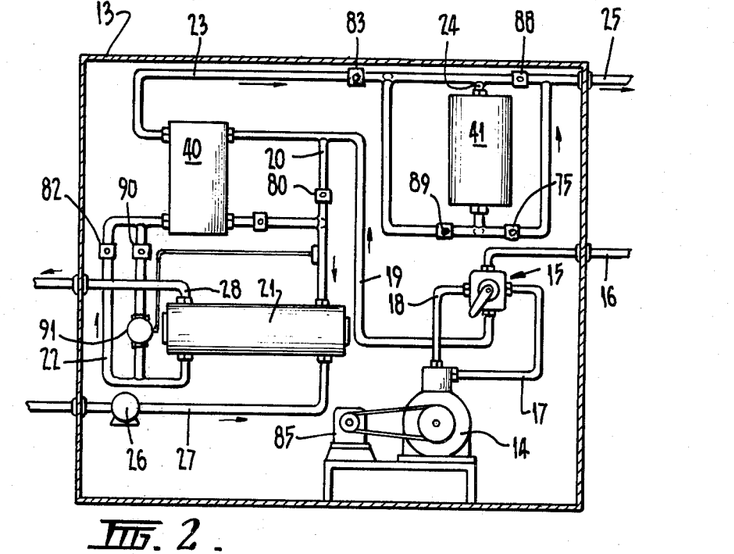
FIG. 2 is a view of the components of the system.

Also, in a stylised manner we illustrate in FIG. 2 a container 13 in which the various components of the heat pump, other than the absorber plate and heat sink are mounted.

Although these will be described further hereinafter in relation to the flow drawings of FIGS. 8 and 9, the components in the container comprise a compressor 14 which, in the heating mode, receives gas from the absorber plate by means of a four way valve 15 which is in direct connection with the plate by line 16 and input being along line 17 and the output line 18 which returns to the four way valve. From the four way valve, line 19, the hot gas passes along line 20 to a heat exchanger 21 in which it delivers up its heat and in the form of a liquid passes along line 22 through refrigerant heat exchanger 40 which is only operative in the cooling mode from whence it passes by lines 23 and 24 to a receiver 41 from whence, in due course, it passes by line 25 to the solar absorber plate.

In FIG. 2 we also show a large number of check valves, which are indicated in this figure as internally circled valves C. The purposes of which will be described hereinafter with relation to FIGS. 8 and 9.

To optimize performance it is necessary that the size of the absorber plate 10 and the displacement rate of the compressor 14 be closely matched.

The water circuit comprises a pump 26 which feeds, by line 27, water to the heat exchanger and the water is returned to the heat sink by line 28.

The heat sink, as will be described hereinafter, can be of any one of several forms.

Because of the relatively low load temperatures preferred, the most satisfactory application of the invention in terms of COP is in heating swimming pools, both domestic and commercial pools. It will be appreciated that, depending on the volume of water in the pool, so the size of the absorber and the capacity of the compressor are varied.

Where the heat pump is to be used for heating swimming pools it will be appreciated that the condenser can be simply located in the filter line of the pool and that the pool itself will comprise the heat sink.

The invention can also show a good COP in the heating and cooling of dwellings and can be used for hot water services although the COP in such application is definitely reduced.

The effectiveness of the unit in relatively high temperature operations can be increased by double staging the system using a flash inter cooler.

The relative COP's will be discussed hereinafter.

Figure 3:
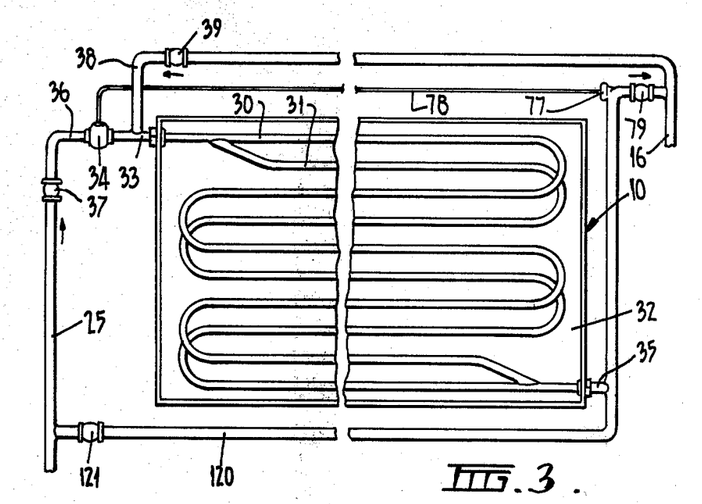
FIG. 3 is an elevation of one form of absorber plate which is suitable for a dual mode machine.

FIG. 3 shows one particular form of evaporator plate 10. In this form we have two runs of copper tubing 30,31 mounted on a copper plate 32. The tubes, as can be seen, overlap to follow design calculations which appeared to give an extremely good transmission of heat.

In practice, the tubes are soldered throughout their length to the plate so that good heat conduction is obtained. Associated with the inlet 33 to the plate we provide a thermostatic control valve 34 which is operated by bulb 77 connected through line 78 from adjacent the outlet 35 of the plate whereby the fluid flow through the plate can be automatically controlled so that the outlet superheat temperature of the vapour is that which is required for efficient operation of the unit. Depending on the application with which the unit is to be used, it will be understood that there can be wide variations in the required outlet temperature as, if the unit is to be used for low temperature applications, such as heating swimming pools, then the optimum conditions may be to obtain a high throughput at relatively low temperature rather than a lesser throughput at a higher temperature.

The inlet 36 to the thermostatically controlled valve 34 is a continuation of line 25 of FIG. 2 and in this there is a one way check valve 37 which permits flow in only the direction indicated by the arrow. There is a second inlet line 120 which passes through one way valve 121 which carries liquid from the outlet 35. There is a still further inlet line 38 which by-passes the thermostatic expansion valve and this also has a check valve 39 to prevent the liquid from by-passing the absorber plate. This inlet line 38, as will be described hereinafter, is used when the plate is being used as a cooler.

The prefered absorber plate differs from conventional plates in that it is not insulated and, preferably, both sides of the plate can be exposed. In areas of high solar insolation insulation may be used on one side only.

The reason for this is because the heat pump of the invention is designed to operate at relatively low temperatures near to air temperature and heat losses from the plate are not so important as in other solar devices. Thus the necessity of insulating the rear of the plate and providing a heat transparent cover, such as glass, is obviated and, in fact, the plate can absorb energy from the wind.

Also, we have found that there is no necessity to provide a selective surface on the plate and it can be simply painted or otherwise treated to give a matte black finish.

We have also found, particularly in the latitude of Melbourne, Australia, 37°49', that although it is desirable to have the plate directed in a northerly direction the angle of the plate does not appear to be critical. In certain circumstances, for example, where the heat pump of the invention is to be used in a cooling cycle, it may be desirable to have the plate at an angle higher than the optimum angle, such as 90° to the horizontal to permit maximum heat transfer to the surround but basically this has not been felt necessary. Should some modification for cooling be required it may be better to directly cool the plate. This will be described more fully hereinafter.

Figures 4, 5:
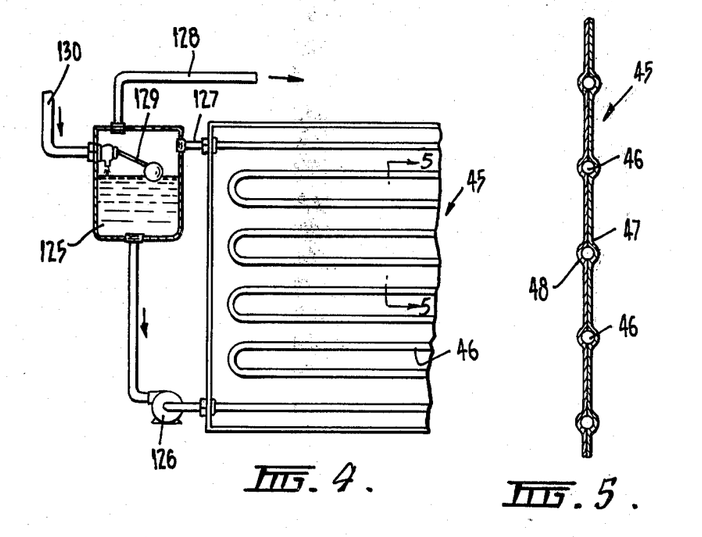
FIG. 4 is an elevation of a second form of plate, suitable for heat pump operation with a flooded evaporator and float control.
FIG. 5 is a section along line 5—5 of FIG. 4.

FIGS. 4 and 5 show a schematic view of an alternative type of plate which also operates under different conditions to the form of FIG. 3. In these views it can be seen that the tubing 46 is formed integral with the plate 45 and in fact, two plate members 47,48 are connected together with a single continuous tube being formed between the two plates by blowing or otherwise. This form of arrangement is basically conventional and, normally, the metal would be aluminium rather than copper and we have found that where aluminium is painted black its thermal characteristics for this purpose are not essentially different from copper. Also, where an absorber plate of this type is being used it is only possible to have one continuous tube, unless there is a sandwich of three plates, or it would be essential to provide means whereby the tubes overlap. Thus the only practical method is a sandwich of three sheets with one tube between one outer sheet and the central sheet and the other tube between the other outer sheet and the central sheet. It is possible to optimise a single tube and the loss in efficiency would probably not be sufficient to make a three sheet sandwich economically viable.

As stated above FIG. 4 shows an evaporator operating in a mode different to that of FIG. 3. In this case a flooded evaporator system is used. The inlet to the tubing 46 is from a liquid reservoir 125 which at its outlet is associated with the pump 126 which feeds the liquid to the tubing 46 and causes it to move through the tube to an outlet 127 in the reservoir. That which vapourises is drawn along suction line 128 by the compressor. As the vapour is removed then a float control valve 129 opens and additional liquid can enter the reservoir through pipe 130 which may be associated with a receiver to which the liquid from the heat exchanger is fed.

Figures 6, 7:
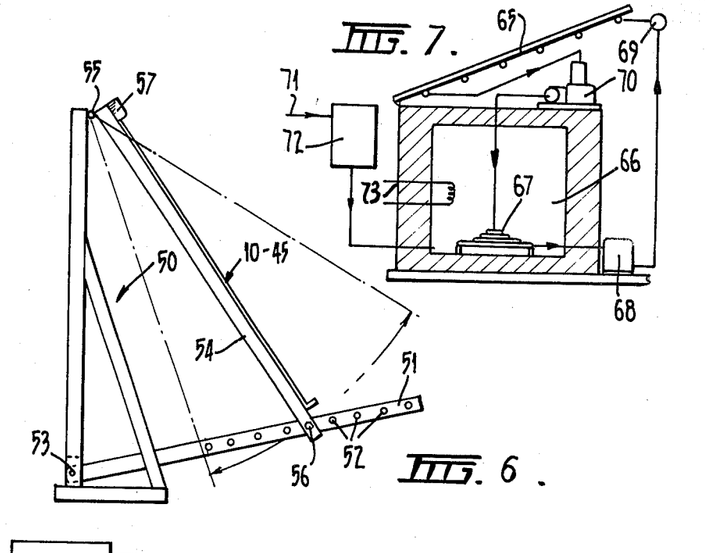
FIG. 6 is an arrangement of absorber plate which permits angular adjustment of the plate.
FIG. 7 shows a domestic hot water service using a natural convection condenser located in the storage tank and which is suitable for installation in a roof space.

FIG. 6 shows one particular way in which an absorber plate, which may be a plate similar to that of FIG. 3 or FIGS. 4 and 5, may be mounted to permit its angle to be varied provided flexible refrigerant connections be used.

This figure shows a frame 50 having a pair of outwardly extending apertured bars 51, the apertures 52 of which are spaced and the bars are pivotted around pivot 53 which bars are adapted to associate with side frame members 54 between which the absorber plate 10 or 45 is located. At its upper end, the absorber plate is provided with a hinge pin 55 and on releasing the bolts 56 from each side of the side frame members 54 so this member and the perforated bar 51 can be caused to take up one of a number of alternative positions which may provide a degree of movement shown by the arrow heads which can be a total movement of 40°. As an alternative a screw adjustment may be preferred in practice. As mentioned earlier, we find that, generally, such movement is not required but in some areas it could be useful to vary the effectiveness of the evaporator, particularly when it is radiating as a condenser during hot months.

Where the plate is moveable the inlet and outlet refrigerant lines are preferably flexible.

Schematically shown across the top of the absorber 10 or 45, there is a transverse member 57 which may serve one of two purposes. In either case it is designed to be used to cool the plate during the warm months when the plate is being used as a condenser and, in one form, there may be a slotted tube through which air may be passed to cool the surface of the plate and in another form may be a perforated water pipe or the like whereby water can be sprayed on the surface of the plate and, by evaporation, help cool its surface. Neither of these arrangements are shown fully as their operation should be completely understood from this description.

FIG. 7 is a schematic view of a domestic hot water service incorporating the concept of the invention. In this case there is an absorber plate 65 which may be located in the same way as the absorber 10 of FIG. 1 and which has located therebeneath a storage tank 66 which has therein a condenser 67 which may simply be a length of coiled copper tubing and from which the liquified refrigerant can pass to a receiver 68 which passes, by way of a thermostatically controlled valve 69, to the absorber plate 65. The outlet of the absorber plate 65 passes to a compressor, shown diagramatically at 70, and from the compressor to the condenser 67. The tank 66 is fed from a town water supply 71 by means of a header tank 72. Associated with the main tank there may be an auxilliary heater 73 which can be thermostatically operated when the temperature of the water in the tank drops below a pre-determined minimum. Alternatively, this can operate on a night rate electricity supply and the solar energy can maintain the temperature during the day thus restricting the amount of night rate power required.

This arrangement can be designed to be totally enclosed within a ceiling space and thus does not encroach on any of the living area of the house.

The operation of the heat pump of the present invention will now be described in reference to the flow sheets of FIGS. 8 and 9, FIG. 8 being the heating cycle and FIG. 9 being the cooling cycle. When the compressor is started the liquid refrigerant, normally a Freon (Registered Trade Mark), commences to move from receiver 41 through check valves 75 and 76 and to the thermostatic expansion valve 34.

From this valve, initially, a small quantity of the liquid is permitted to enter the tube or tubes on the plate 10 or 45, the drawing being labelled as plate 10. On movement along the tubes the liquid Freon vaporises and finally leaves the plate along line 16 which has associated therewith a sensor bulb 77 which is connected through line 78 to the thermostatic control valve 34 so that the position of the valve can be controlled by the temperature of the out-flowing vapour.

Thermostatically controlled valves can be obtained in a wide range of temperatures and the valve used should, of course, be selected depending upon the particular application with which the heat pump is to be used.

Although not illustrated an alternative arrangement is to provide two or more thermostatic expansion valves each having a superheat setting higher than the previous valve of the series so that as the load increases so a further valve or further valves open.

The line 16 passes through a one way valve 79 and enters the solenoid operated four way valve 15 which is in the configuration indicated and the hot vapour passes to the compressor 14 by means of line 17 and the compressed hot vapour passes along line 18, again through the four way valve 15 along lines 19 and 20 through one way valve 80 to the heat exchanger 21. In the heat exchanger the hot vapour gives up its energy to water which passes from the storage 81, which may be a hot water storage tank, which may be for domestic or commercial hot water or to supply a heat source for a water-/air heat exchanger, a storage tank having an internal coil to enable space water heating or may be a swimming pool or in the filter circuit of the swimming pool. As illustrated there is a pump 26 which pumps water along line 27 to the heat exchanger 21 through which it passes until it leaves the heat exchanger along line 28 and returns to the storage. If required, instead of a pump system being used a thermosyphon system could equally well be used or, as described with reference to FIG. 7, the heat exchanger coil may, in fact, be located within the storage 81 if the system is to be used only for restricted domestic, industrial or commercial water heating. The output of the heat exchanger, which is now liquid passes through the one way valve 82 through the refrigerant heat exchanger 40 and returns along line 23 through one way valve 83 to the receiver 41.

The plate 10 may be provided with a solar sensor 84 which is connected to a controller of the motor 85 so that the compressor speed or displacement can be varied. This arrangement may be such that where the incident solar radiation on the absorber plate is high the compressor speed can be increased and thus the throughput of the system can increase. This means that the total amount of heat being passed to the heat exchanger is greater than would otherwise be the case but the COP is, in fact, reduced. This solar sensor 84 can also operate when the incident solar energy is low to slow or stop the compressor and, if necessary, to initiate actions to cause a secondary heating system, such as a night rate electric heating system, or an auxilliary direct system 95 to be used.

Figure 8:
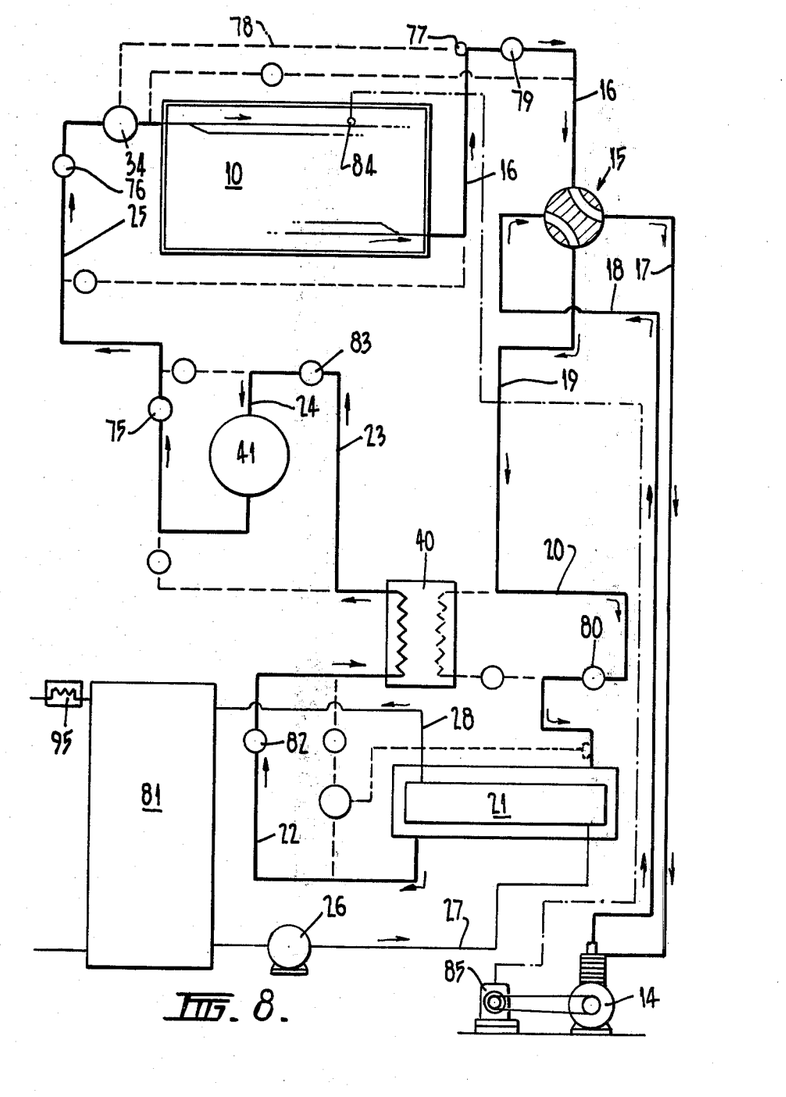
FIGS. 8 and 9 show schematically the refrigerant and water paths when used for heating and cooling water respectively.
Figure 9:
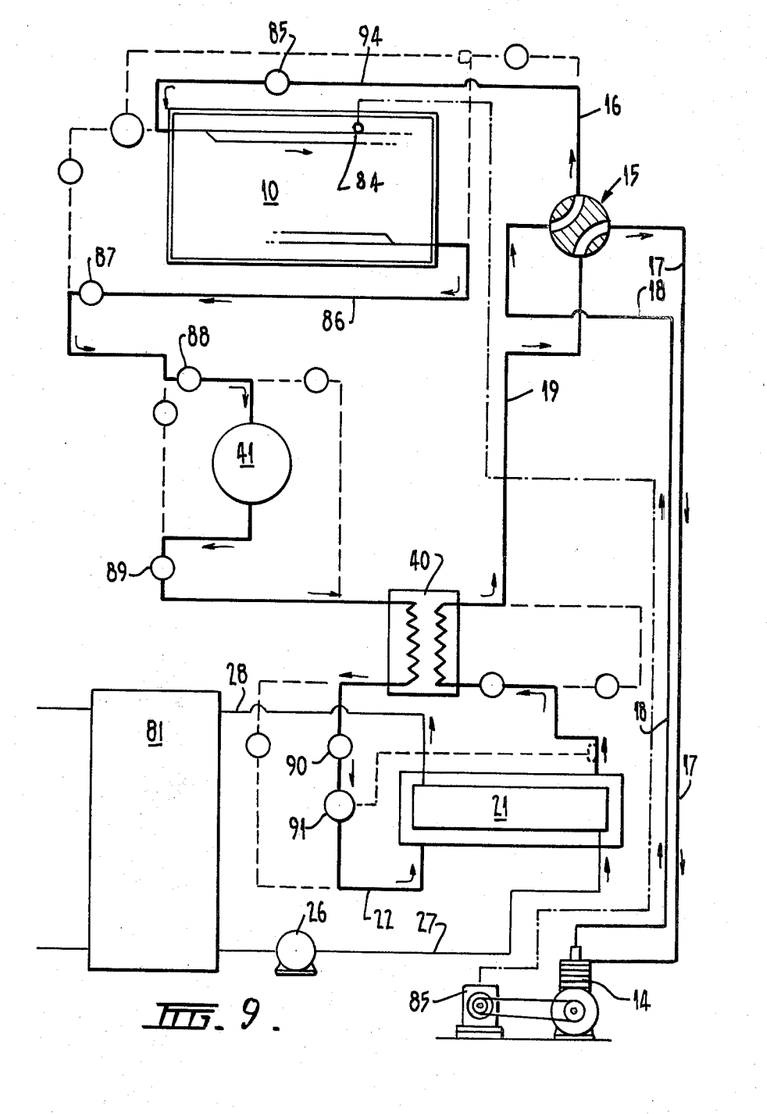

The cooling cycle as shown in FIG. 9 is effectively the reverse of the cycle shown in FIG. 8.

In this case the four way valve 15 operates in the opposite sense and the vapour going to the compressor comes from the heat exchanger 21 by way of the refrigerant heat exchanger 40 to the valve 15 and thus the vapour is passed by line 17; the vapour is then transmitted by line 18 back to the four way valve 15 and from there by lines 16 and 94 through one way valve 96 to the inlet of the plate 10. During its passage through the plate the vapour liquefies and the liquid is passed by line 86 through the one way valves 87 and 88 to the receiver. The liquid from the receiver passes through one way valve 89 to the refrigerant heat exchanger 40, from this through a one way valve 90 to a thermostatic expansion valve 91 by line 22 to the heat exchanger. In this case the water or other material from the storage 81 gives up its heat to the vapour in the heat exchanger and is therefore cooled.

Solar sensor 84 may also be used to initiate cooling on plate, as may a head pressure detector.

It may be preferred, although this is not illustrated, to reverse the water so that it is passed from the top of the tank that is from line 28 but is interconnected to line 27 before entering the heat exchanger, and vice versa.

The COP of the heat pump when used in the cooling mode is not as great as in the heating mode and this can be overcome to a certain extent in one of two ways. In the first of these, as indicated by FIG. 6, the plate may be moveable so that it presents a less effective aspect for absorption and thus allows a better use of radiation to the atmosphere for condensation of the refrigerant. The second method which is shown diagramatically in FIG. 6 is the provision of either an air blast or passage of water from the top of the plate, at 57, so that the plate is artificially helped to dissipate excess heat.

Figure 10:
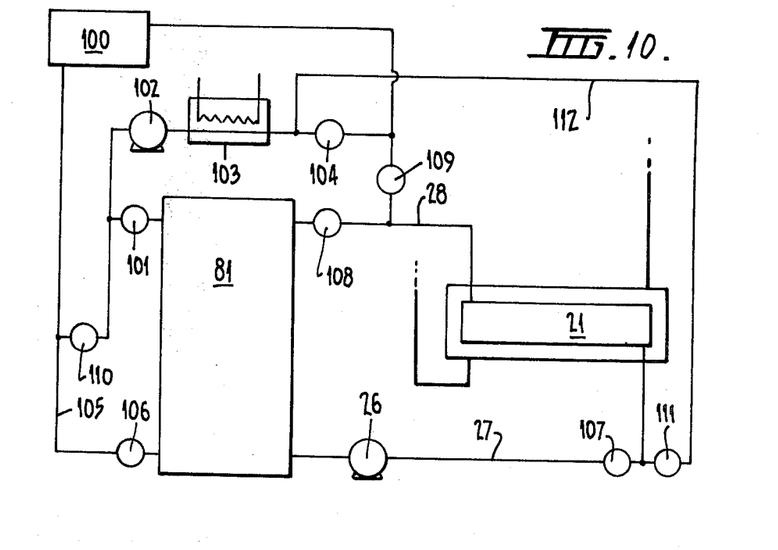
FIG. 10 shows schematically a way of by-passing the storage tank when rapid heating/cooling is required.

The arrangement of FIG. 10 shows a water to air transfer which can be used to either heat or cool air without passage of heat transfer medium through the storage i.e. rapid heating or cooling.

Under normal circumstances, the source of heat or cold, tank 81 is connected to an air heater/cooler 100 through valve 101, pump 102, auxilliary heater 103 and valve 104 and the return flow is along line 105 and through valve 106. When the cooling cycle is in operation and it is required to obtain rapid cooling, that is not to await cooling of the whole of the water in tank 81 the inlet and outlet valves to the tank, valves 107 and 108, are closed as are the valves 101, 106 and 104. Valves 109, 110 and 111 are opened and thus the tank is by-passed. Water flowing from the heat exchanger passes through valve 109 directly to the heater/cooler 100 and any reverse flow is prevented as valve 104 is closed. The cool water then passes directly through the heater/cooler and a fan or the like associated therewith blows air over the fins of the heater/cooler thus lowering the temperature of the air. The warm water then passes along path 105 through valve 110 to pump 102, which is the circulating pump and then returns along line 112 through valve 111 and into the heat exchanger.

When normal conditions are required, it is only necessary to reclose valves 109, 110 and 111 and open valves 101, 104, 106, 107 and 108.

We have found that the COP of the heat pump of the invention is very good, as compared to other solar systems of which we are aware and this is particularly true where relatively low temperature heating is required for the load condition.

For example, in Melbourne, when a heat pump of the invention was used with a swimming pool, or to develop the order of temperatures required in a swimming pool, we obtained a COP of between 9 and 13 in the months preceding and after the normal swimming season. This indicates that in Melbourne's climatic conditions, the energy cost of pool heating using the heat pump would be approximately 10% of the energy cost of using electricity directly. Even where low cost alternative fuels are available for pool heating, this invention will generally be very competitive.

For home heating the COP, during the winter months is of the order of 4 to 6 and again heat pump energy costs are relatively inexpensive when compared to conventional system energy costs.

For providing domestic hot water, the COP is of the order of 2.4 to 2.8 and the heat pump would be economic in areas having standard electricity rates, with no reduced rates for night water heating.

The above figures indicate that the invention is particularly suitable for applications where the end use temperature requirements are low.

It will be appreciated that the cost of the absorber of the invention may be relatively inexpensive compared with conventional solar receiving absorbers as there is no need for insulation, covering or selective surfaces. Many of the other compenents are readily available commercially.

We claim:

1. A solar boosted heat pump for providing heating or cooling for domestic and other purposes, comprising:
   a heat conducting plate having a front surface which in operation is exposed to the sun and atmosphere, said plate having an uninsulated rear surface which in operation is exposed to the atmosphere, and said plate having at least one refrigerant fluid carrying plate tube in heat transfer relationship therewith;
   a closed refrigerant flow system, said tube forming part of said closed refrigerant flow system and having an inlet and an outlet;
   said plate operating as a direct solar and ambient heat absorber when the pump is in its heating mode and as a radiator when the pump is in its cooling mode; and,
   said refrigerant flow system also including a compresssor and a heat exchanger in heat exchange relationship with a heat transfer medium; said plate includes sensing means for varying the speed and/or displacement of said compressor depending on the light incident onto or energy on said plate.

2. A heat pump as claimed in claim 1 wherein said plate is a metallic sheet, and said at least one fluid carrying tube is a continuous tube in heat exchange relationship with said plate.

3. A heat pump as claimed in claim 1, including a pair of fluid carrying tubes in parallel relationship.

4. A solar boosted heat pump for providing heating or cooling for domestic and other purposes, comprising:
   a heat conducting plate having a front surface which in operation is exposed to the sun and atmosphere, said plate having an uninsulated rear surface which in operation is exposed to the atmosphere, and said plate having at least one refrigerant fluid carrying plate tube in heat transfer relationship therewith;
   a closed refrigerant flow system, said tube forming part of said closed refrigerant flow system and having an inlet and an outlet;
   said plate operating as a direct solar and ambient heat absorber, said refrigerant flow system including a compressor and a heat exchanger in heat exchange relationship with a heat transfer medium; and
   said plate including sensing means for varying the speed and/or displacement of said compressor dependent on the light incident onto or energy on said plate.

5. A heat pump as claimed in claim 1 or 4, when operating in its heating mode, including an auxilliary heating system associated with a load in connection with said heat exchanger and said auxilliary heating system being activated when the heat pump is operating in its heating mode and when said sensing means reaches a predetermined parameter.

6. A heat pump as claimed in claim 1, including a by-pass to provide rapid heating or cooling, the heat transfer medium by-passing any heat sink and being fed directly to a radiator or other user of energy.

7. A heat pump as claimed in claim 1, wherein said heat exchanger is a condensor when said heat pump is operating in the heating mode and is located within water tank means or the like.

8. A heat pump as claimed in claim 1, when operating in the cooling mode, wherein said plate includes means to assist cooling thereof.

9. A heat pump as claimed in claim 8 wherein said cooling means is a slotted tube at the tope of the plate through which air is blown onto the plate.

10. A heat pump as claimed in claim 8, wherein said cooling means includes a perforated water pipe at the top of said plate through which water can be directed onto said plate.

11. A heat pump as claimed in claim 1, including:

first valve means in said refrigerant flow system operable when the pump is in its heating mode to connect the outlet of said plate tube to the inlet of said compressor and between the outlet of said compressor to said heat exchanger, said heat exchanger being connected to the inlet of said plate tube;

second valve means at said inlet of said plate tube to control refrigerant flow through said plate tube, said second valve means being controlled by the temperature of the refrigerant leaving said plate tube through its said outlet, said first valve means being operable when the pump is in its cooling mode to connect the outlet of the compressor with the inlet of said plate tube and the outlet of said heat exchanger with the inlet of the compressor; and, third valve means controlled by the temperature of the refrigerant leaving said heat exchanger, and the refrigerant from said plate tube outlet being directed to the inlet of said heat exchanger through said third valve means.

12. A heat pump as claimed in claim 11, wherein when the heat pump is operating in its heating mode, said plate inlet valve is a thermostatically controlled valve including a sensing bulb at the outlet of the plate for sensing the temperature of the refrigerant.

13. A heat pump as claimed in claim 11, when operating in its cooling mode, wherein said valve means associated with said inlet of said heat exchanger is a thermostatically controlled valve, the control being at the outlet of said heat exchanger.

14. A heat pump as claimed in claim 11, said first valve means comprising a four-way valve operable to convert operation of the heat pump from its heating mode to its cooling mode or vice versa.

* * * * *